No. 799,701. PATENTED SEPT. 19, 1905.
G. H. ADSHEAD.
PARCEL BUNDLING MACHINE.
APPLICATION FILED NOV. 27, 1903.

9 SHEETS—SHEET 2.

Attest:
Cornuuton
L. B. Middleton

Inventor
George H. Adshead
by Ellis Spear & Company
Attys

No. 799,701. PATENTED SEPT. 19, 1905.
G. H. ADSHEAD.
PARCEL BUNDLING MACHINE.
APPLICATION FILED NOV. 27, 1903.

9 SHEETS—SHEET 4.

Attest
C. Middleton
L. B. Middleton

Inventor
George H. Adshead
by Ellis Spear & Company
Attys.

No. 799,701. PATENTED SEPT. 19, 1905.
G. H. ADSHEAD.
PARCEL BUNDLING MACHINE.
APPLICATION FILED NOV. 27, 1903.

9 SHEETS—SHEET 8.

Attest
O. Madden
L. B. Middleton

Inventor
George H. Adshead
by Ellis Spear & Company
Attys

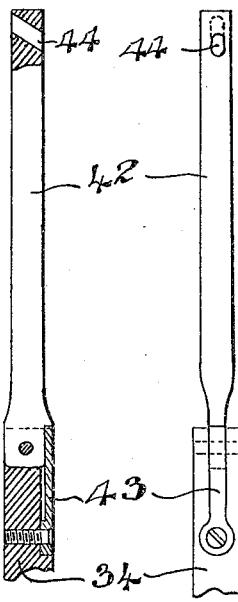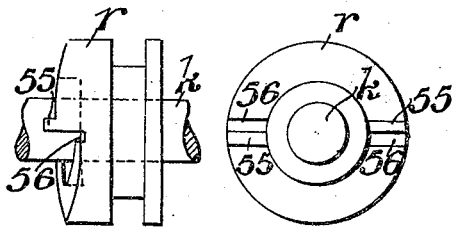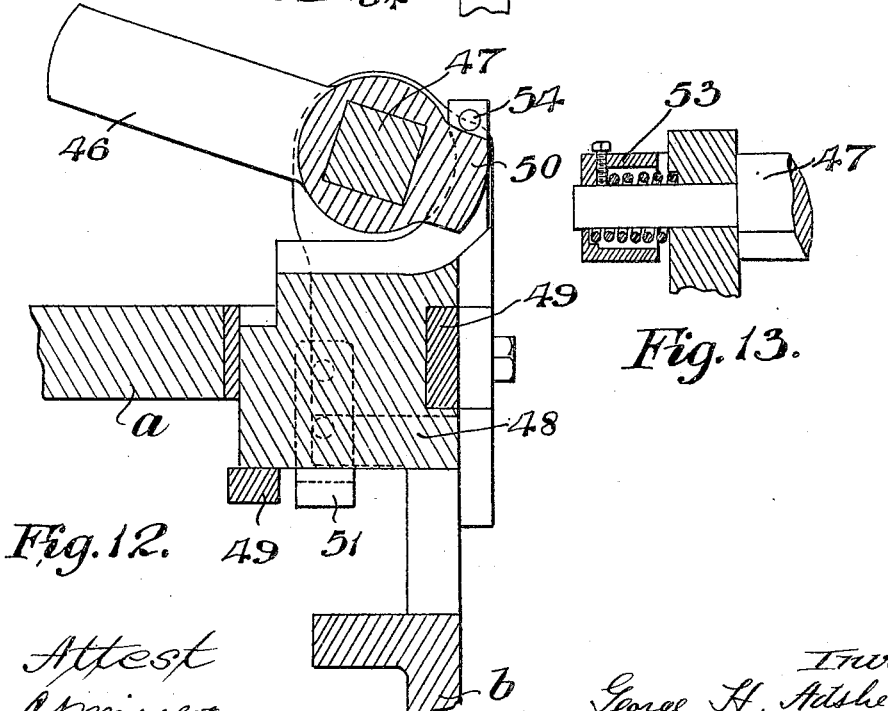

UNITED STATES PATENT OFFICE.

GEORGE HERBERT ADSHEAD, OF LONDON, ENGLAND.

PARCEL-BUNDLING MACHINE.

No. 799,701.          Specification of Letters Patent.          Patented Sept. 19, 1905.

Application filed November 27, 1903. Serial No. 182,922.

*To all whom it may concern:*

Be it known that I, GEORGE HERBERT ADSHEAD, a subject of the King of Great Britain and Ireland, residing at 294 Stanstead road, Forest Hill, London, S. E., England, have invented certain new and useful Improvements Relating to Parcel-Bundling, (for which I have made application for Letters Patent in Great Britain, No. 26,865, bearing date December 5, 1902,) of which the following is a specification.

My invention relates to a new form of bundling-press, and has for object to form a bundle and tie it up automatically.

A more specific object of my invention is to take a pile of newspapers coming from a printing-machine, carry the pile automatically into a bundling-press, and there automatically bind it by means of string, release it and discharge it, automatically taking in the next bundle and repeating the operation.

My invention consists in automatically feeding, compressing, and tying up bundles of material, such as newspapers, continuously without requiring any skilled attention.

My invention comprises (*a*) means for feeding a pile or bundle, (*b*) means for compressing the pile or bundle, (*c*) means for tying up the pile or bundle while in the pressing mechanism by means of string or the like and producing a secure knot, and (*d*) means for discharging the tied bundle.

My invention further consists in combining the means for effecting these various operations in one machine, so that the various operations take place in sequence automatically.

Figure 1:
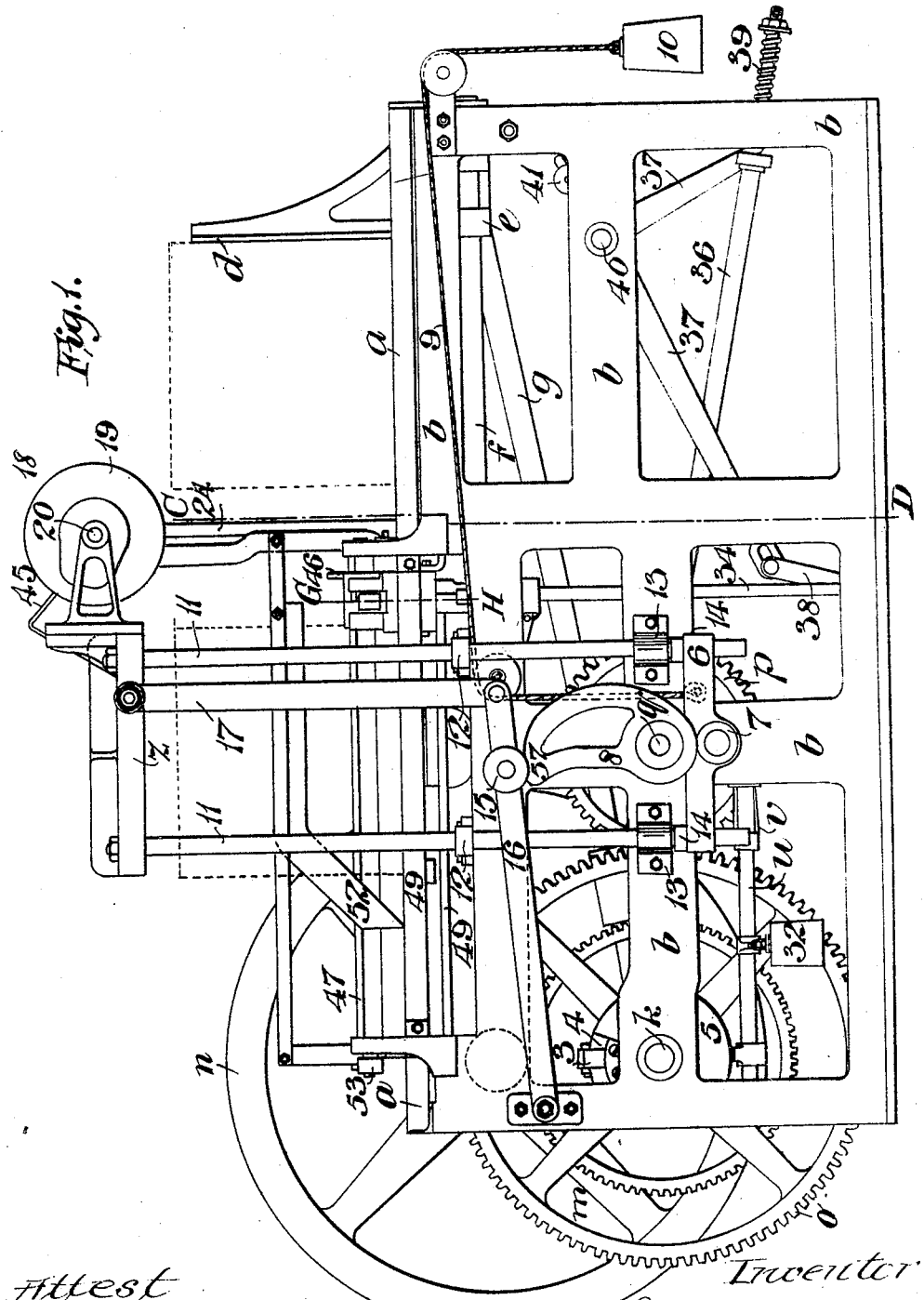
Figure 2:
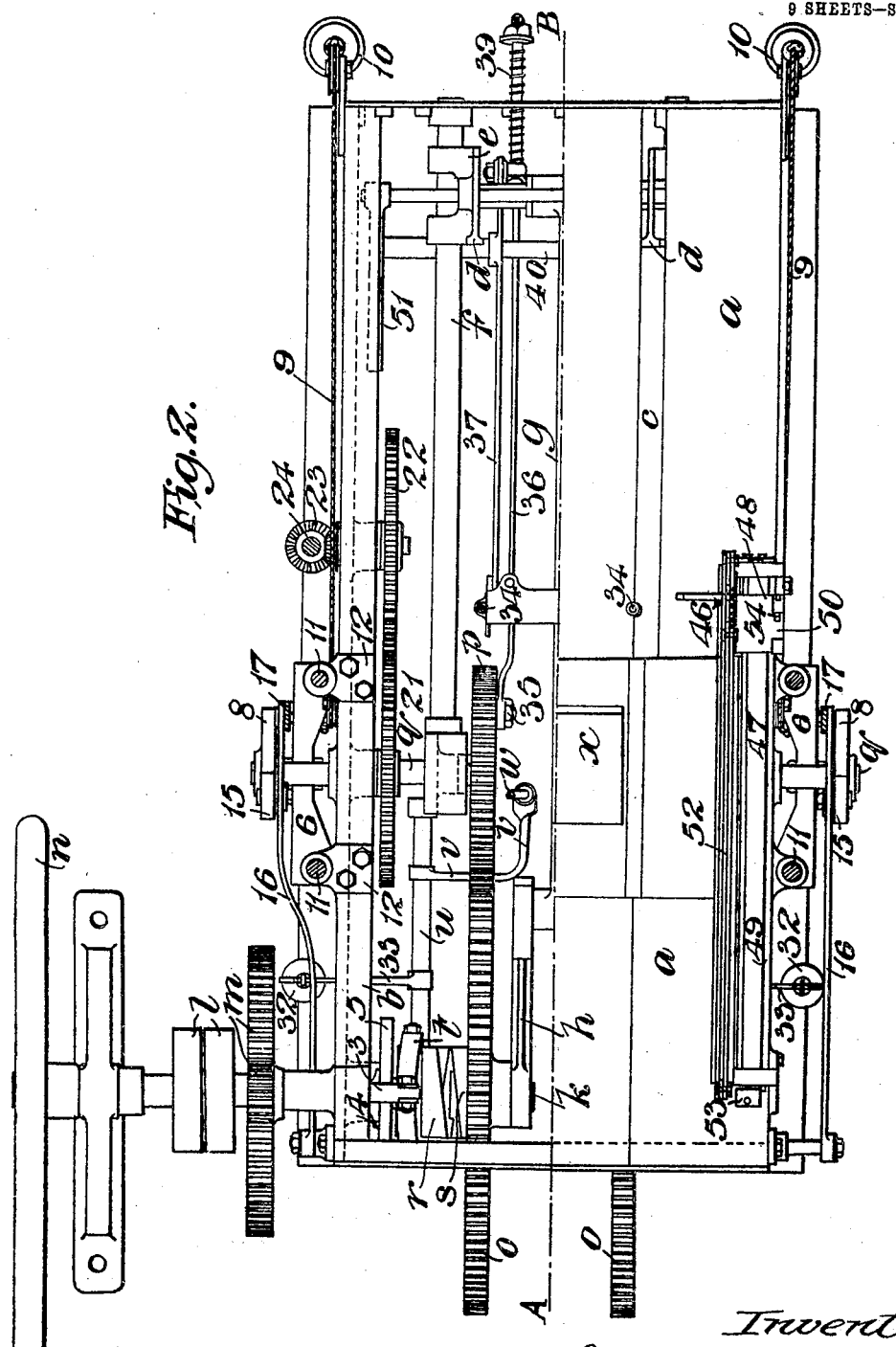
Figure 3:
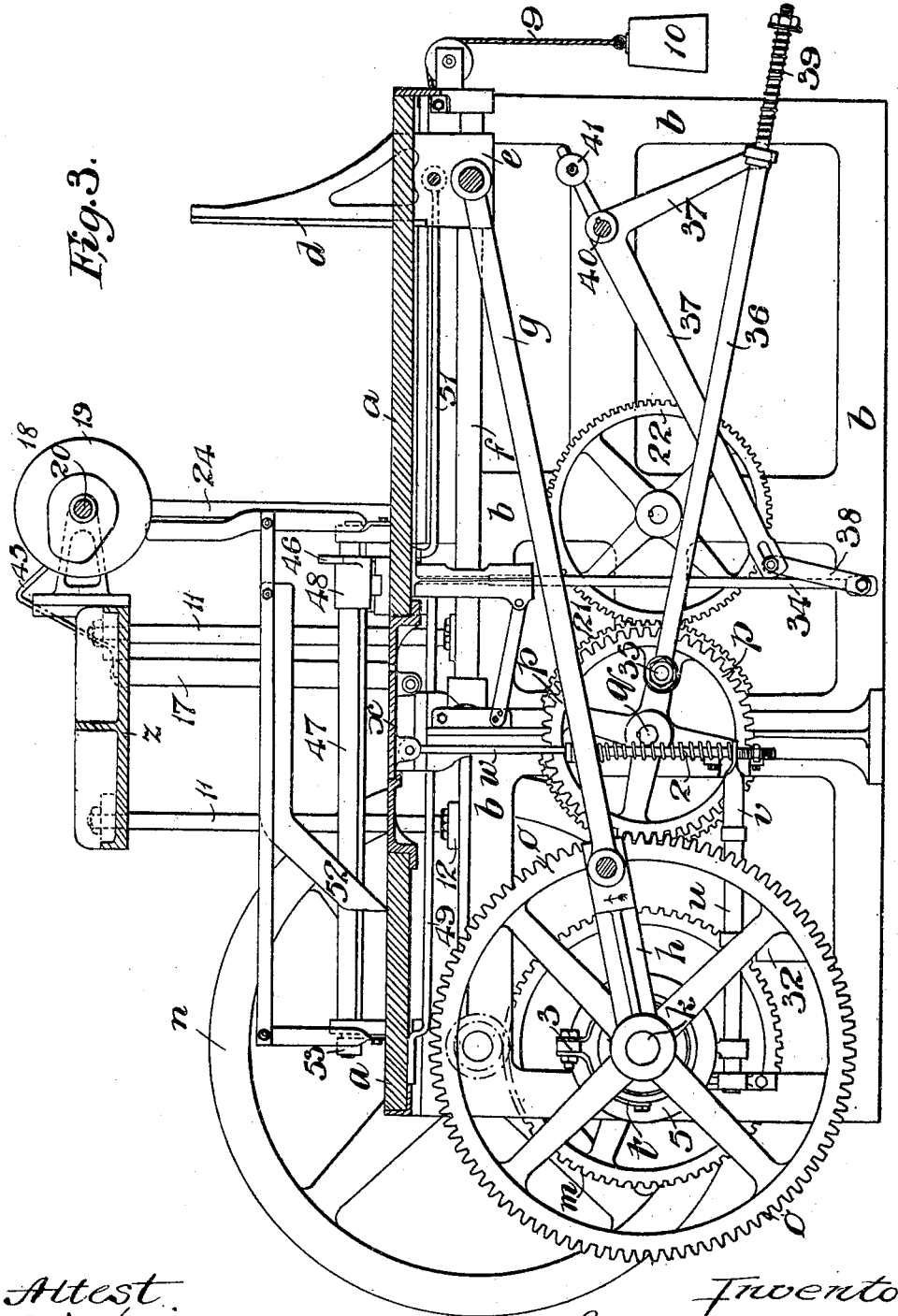
Figure 4:
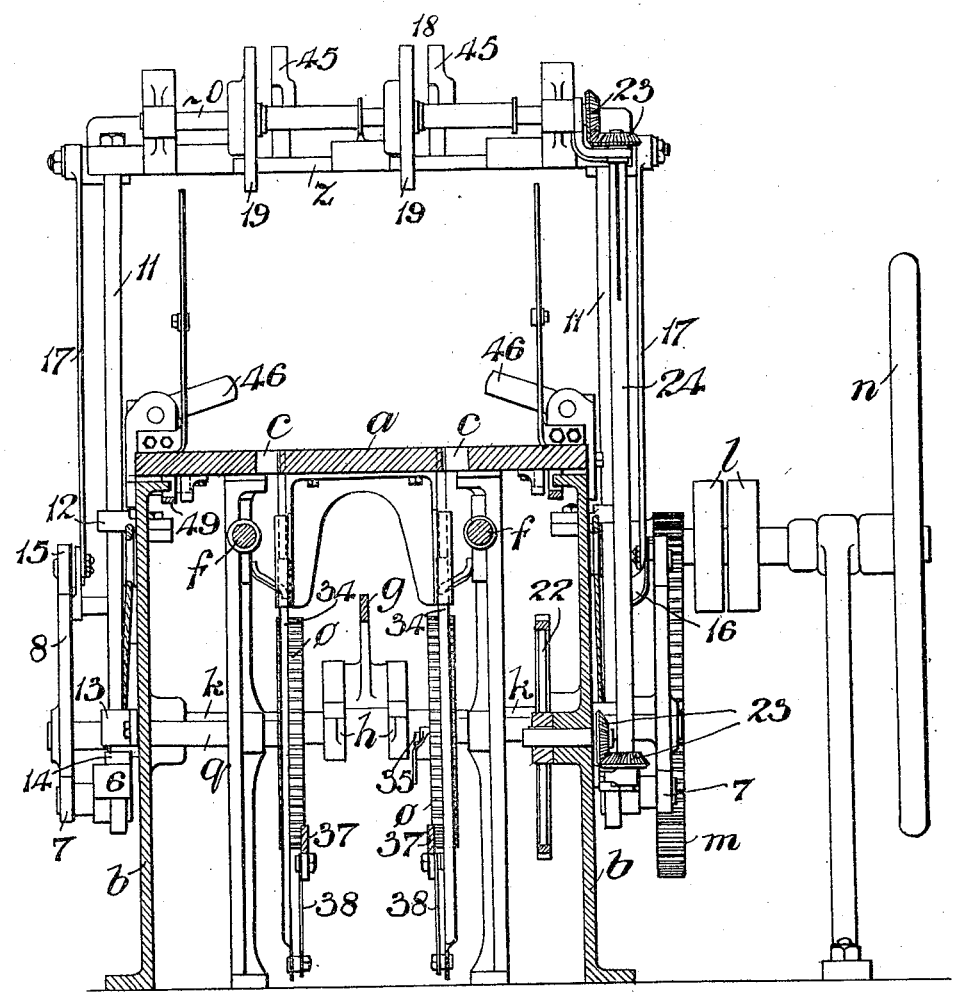
Figure 5:
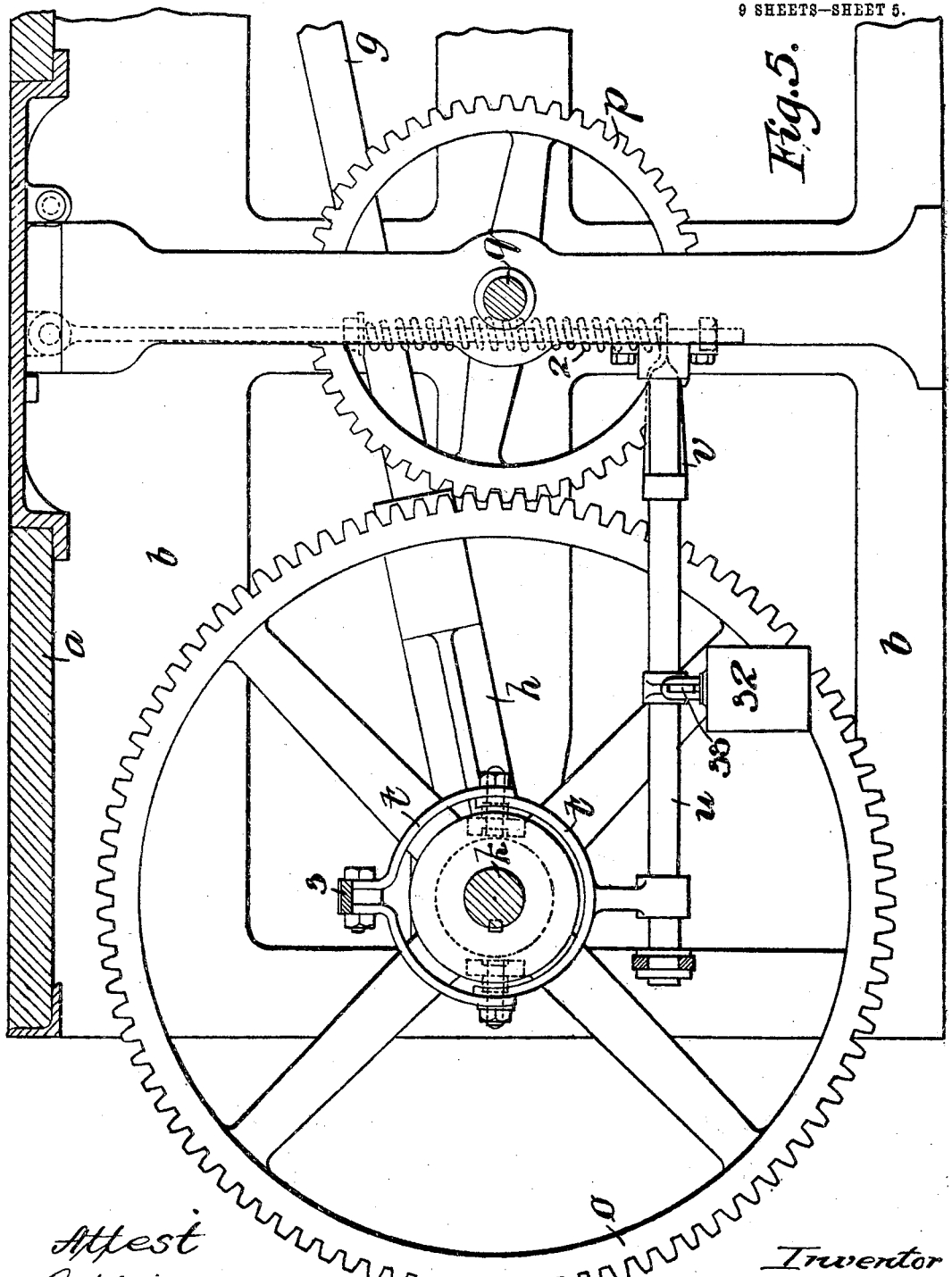
Figure 6:
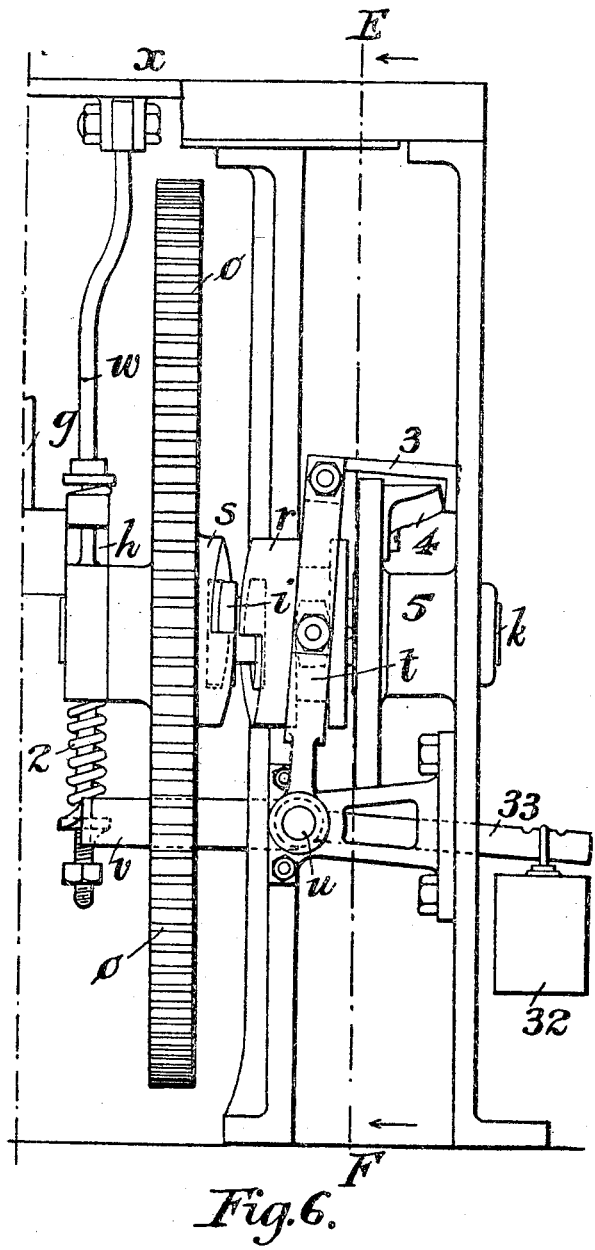
Figure 7:
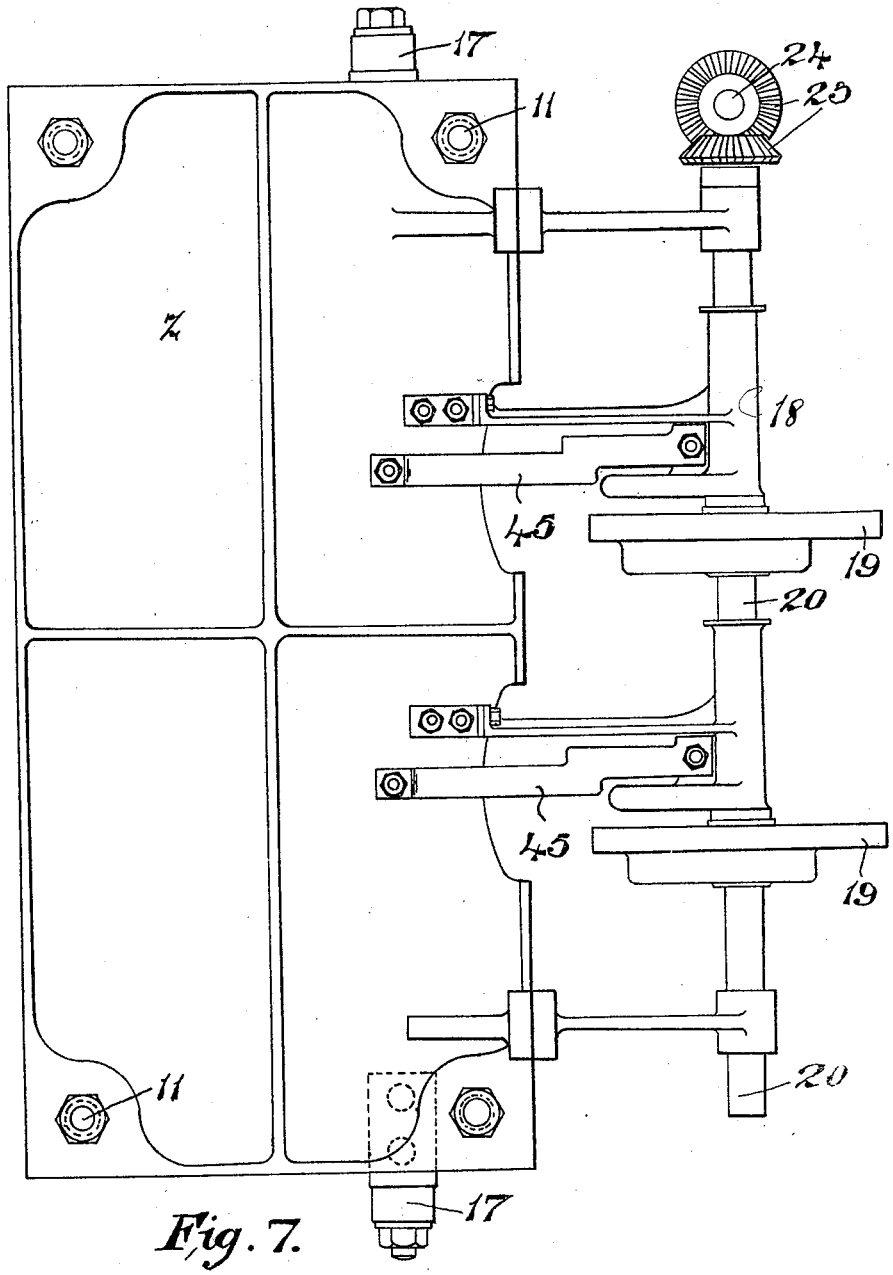
Figure 8:
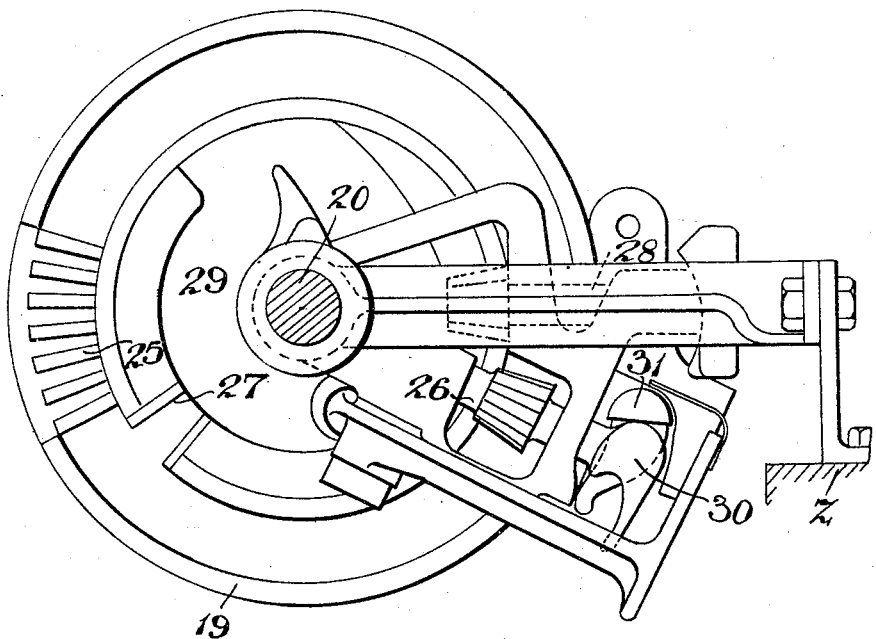

Referring to the accompanying drawings, Figure 1 shows a side elevation of the machine as a whole according to one form, Fig. 2 being a corresponding plan, but with half the table and the compressor-platen supposed removed. Fig. 3 shows a sectional side elevation taken on the line A B of Fig. 2, and Fig. 4 a sectional view on the line C D of Fig. 1, some of the parts being omitted for the sake of clearness. Figs. 5 and 6 are sectional side and half end views, respectively, of the mechanism employed for the intermittent operation of the compressor cam-shaft, the sectional view being taken on the line E F, Fig. 6. Fig. 7 shows a plan of the compressing-plate. Fig. 8 is an elevation of the knotting device, Fig. 9 being a view of the knotter-jaws with the knot partly tied. Figs. 10 and 11 are sectional side and outside end elevations of the pivoted needles themselves. Fig. 12 is a sectional end view of part of the discharging-gear, taken on the line G H of Fig. 1. Fig. 13 is a section through the spring-box attached to the square shaft on which the discharging-fingers slide, and Figs. 14 and 15 show a modified form of clutch. Figs. 5 to 15 are on a larger scale than Figs. 1 to 4 for clearness.

In carrying the invention into effect according to one form the machine is constructed having a table *a* somewhat wider than the pile of papers to be tied and supported on a suitable frame *b*. The table is provided with slots or guides *c*, in which run the fingers *d* of a bundle-feeding device. These fingers are united to a slide *e*, running on guide-bars *f*, the slide being reciprocated by means of a connecting-rod *g*, operated by means of crank-pin and cranks *h* on the rotating shaft *k*, disposed in the bed of the machine below the table and driven conveniently by pulleys *l* and gear-wheels *m*. A fly-wheel *n* is also preferably provided. One revolution of this shaft *k* (hereinafter called the "main" shaft) corresponds to a complete reciprocation of the slide *e* and fingers *d*. This again corresponds to the traverse of a bundle from the receiving end of the machine into the bundling position—namely, into a position within the compressor—together with the return of the fingers in readiness to feed forward another bundle.

On the main shaft *k* (see Figs. 5 and 6) is loosely sleeved a spur-wheel *o*, gearing with another wheel *p* of half the diameter, which is keyed to the cam-shaft *q*, and a clutch *r* is arranged on the shaft *k*, so as to engage with its counterpart *s*, formed on the boss of the wheel *o*. Longitudinal axial movement of the wheel *o* is prevented by means of a collar *i*, fixed on the main shaft *k*. The part *r* is adapted to rotate with the main shaft *k* by means of a feather, but is capable of longitudinal axial movement relatively thereto and is moved into engagement by an ordinary clutch fork or ring *t*, carried by the shaft *u*. A lever *v*, also fixed to the shaft *u*, is connected through a rod *w* to a hinged plate *x*, situated below the compressing-platen *z*, a spring 2 being interposed, as shown, to allow the lever *v* to rise when necessary without lifting the hinged plate *x*. The clutch *r* is automatically withdrawn once every revolution of the main shaft by means of an L-shaped piece 3, fixed to the clutch-ring *t*, engaging a cam-surface 4 on the disk 5, which is keyed to the main shaft *k*. The clutch is forced back into engagement by the spring 2. Thus when working normally with a series of bundles the clutch $r$ drives the spur-wheel $o$ for half a revolution of the main shaft and is then withdrawn automatically, leaving this wheel idle for the remaining half-revolution, and so on, the cam-shaft $q$, with the proportions of spur-wheels adopted, therefore making one complete revolution every alternate half-revolution of the main shaft $k$.

In order to prevent the clutch being thrown into gear and the various parts of the machine thereby operated when the supply of bundles ceases, the following mechanism is employed: A weight 32 is hung on the end of the lever 33, fixed to the shaft $u$, and this weight counterbalances the hinged plate $x$ and parts connected thereto, so that when no bundle is fed forward to keep the hinged plate down it rises and the clutch $r$ is held out of engagement. The plate $x$, however, being hinged on the side from which the bundles are fed, is readily depressed by the weight of a new bundle into a position flush with the rest of the table $a$, as shown in Fig. 3, further downward motion being prevented by the check seen at the left-hand edge of the plate in the same figure. In this position the plate $x$ and table $a$ may be considered, so far as the compressing operation is concerned, to form one fixed element, the function of which is to supply the necessary resistance to the compressing-platen in the direction in which the dimensions of the bundle are reduced. It will be seen that the area of the plate $x$ need only be a small proportion of that of the bundle. Although this clutch mechanism has been described with reference to its position on one side of the main crank only, it will be understood that a similar duplicate arrangement is fitted on the other side.

Referring now to the means for operating the compressing-platen $z$, cross-bars 6, one on each side of the machine, carry rollers 7, adapted to contact with the cams 8, and are held up by ropes or the like 9 and weights 10, which are sufficiently heavy to wholly or partly counterbalance the compressing-platen $z$ and parts. The pillars 11, attached to the compressing-platen, are guided in suitable guides 12 and 13, secured on the frame of the machine, and are provided with collars 14, fixed to them so that the weight of the compressing-platen and parts thereon is taken by the cross-bars 6. The ends of the pillars 11 pass loosely through the cross-bars 6, so as to allow the press to remain at varying heights, according to the number of papers in the pile. Rollers 15 are arranged, as shown, on the links 16, one end of each of the links being pivoted to the frame of the machine, while the other ends are connected to the platen by other links 17. It will be seen that the rollers 15 and links 16 17 are not absolutely essential, as the weights 10 may, if preferred, be of sufficient magnitude to raise the compressor-platen to the highest position. The action of this gear is as follows: The cams 8 at some part of their revolution engage with the rollers 15 and lift the counterbalanced platen-plate to its top position. Passing on, the cams leave the rollers 15 and engage with the rollers 7 on the cross-bars 6, depressing them and raising the balance-weight. The platen-plate meanwhile follows up the movement of the cross-bar by gravity until it rests on the bundle, which is in this case compressed by the dead-weight of the platen and other parts moving with it. It is clear that for any given setting of the collars 14 on the pillars the bundle must be above a certain minimum thickness or the platen will not reach it in its lowest position.

Figure 9:
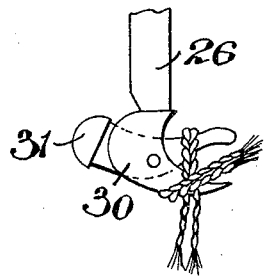

On the top of the compressing-platen $z$, at its bundle or pile receiving side, I mount a pair of knotting devices 18. These knotting devices are of known construction, and in themselves form no part of my invention. I have found suitable such knotters as are used in sheaf-binding harvesting-machines. One type of these knotting devices comprises three main elements; first, a string-retaining device on one spindle; second, a knotting device mounted on another spindle, and, third, a cutting-off device. Referring to Fig. 8, a general view of the knotter is shown. A wheel 19 is mounted on a shaft 20, driven by gearing from the compressor cam-shaft $q$. This gearing (see Figs. 3 and 4) may consist of a spur-wheel 21, mounted on the cam-shaft $q$, gearing with a second spur-wheel 22. This wheel in turn drives the knotter-shaft 20 through the bevel-wheels 23 and vertical shaft 24. Provision is made for the rise and fall of the platen, preferably by grooving the shaft 24 and fitting a feather to one of the bevel-wheels, which engage with it in a manner well understood. The wheel 19 is adapted to operate the main parts of the knotter in proper sequence, and for this purpose is provided with teeth 25, adapted to operate the spindle 26 of the knotting devices proper, other teeth 27 adapted to operate the retainer-spindle 28 and a cam-groove 29 adapted to operate the element which after cutting the string draws the knot off the knotting device. Fig. 9 shows a view of the knotter-jaws 30 with the knot partly tied, these jaws being opened at the proper moment by the tail end 31 engaging with a suitably-disposed cam-surface and closed by an adjustable spring. The knotters are mounted transversely over the slots $c$ in the press-table $a$ and coöperate with a pair of special needles projected upward through these slots, one needle being required in conjunction with each knotting device.

The needle-bars 34 are mounted in suitable guides vertically and are operated by means of a crank-pin 35, carried on one of the spur-wheels $p$, through levers 36 37 38, as shown, a spring 39 being arranged on the end of the lever 36, so that the needle-bars 34 may be stopped at different heights, as hereinafter described. There are two levers 37, both keyed on the cross-shaft 40, one having two arms, as shown in Fig. 3, the other only one arm, as it is not necessary to have the crank-pin 35 and lever 36 duplicated. The position of the crank-pin 35 is so arranged as to bring the needles up into position for tying the bundles at the proper moment and withdraw them so that a new pile or bundle may be fed forward under the compressing-platen.

The weight of the needle-bars may be counterbalanced by a weight 41, fixed on the shaft 40.

The upper ends of the needle-bars are shown in detail in Figs. 10 and 11 and are provided with pivoted ends 42, normally held in a vertical position by the springs 43. These pivoted ends are provided with eyes 44, through which the tying-string passes, the roll of string being placed in any convenient position in the bed of the machine.

Deflectors 45, suitably mounted on the compressing-platen, are arranged in the path of the needles, so that they will be arrested at the correct height for tying, and their pivoted ends 42 will be forced over so as to carry the string from the needle across the knotter. The number of knotters and strings need not be limited to two, as one, two, or more may be used.

The operation of the machine dealing with piles of newspapers is as follows: Assuming a pile of papers to be deposited on the table in front of the feeder-arms $d$ in any suitable manner and the mechanism to be in the position shown in the drawings, the machine is started and the crank $h$ rotates in the direction indicated by the arrow-head, Fig. 3. The feeding-arms $d$ move forward, carrying the pile of papers into the compressing position, the papers carrying forward the strings which hang from the retaining devices at the top down to the supply-bobbins, thereby embracing the top, front, and bottom sides. Toward the end of the forward stroke the hinged plate $x$ is pressed down by the pile of papers coming onto it, and the spring 2 compressed, thereby forcing down the lever $v$ and throwing the clutch $r$ over against the counterpart $s$; but as there are only two claws thereon no motion will be imparted to $s$, and therefore the wheel $o$, until the claws come into contact, and this happens practically at the end of the forward stroke of the fingers $d$. The feeding-fingers now return, and during the backward stroke the wheel $o$ is turned through a half-revolution, and therefore the wheel $p$ makes one complete revolution, operating the cam-shaft $q$, and thereby allowing the compressing-platen to come down and compress the pile. The needle-bars 34 are at the same time pushed up through the slots in the table in the manner above described, carrying up their strings and passing them into their respective knotters, thus completing the encircling of the four sides of the pile. The knotters then turn on their own axes, gripping the string just below where it is held by the retainer and tying the knot. The retainers then rotate on their axes, gripping the fresh string, and the cutter then comes into operation, cutting off the end coming from the knot. The knotter and retainer-spindles being driven by mutilated wheels or other equivalent devices in the harvester-knotters, which I have found suitable, come into operation at their proper times and are idle during the continued movement of the cam-shaft $q$. This latter continuing to rotate lowers the needle-bars and lifts the compressing-platen clear of the tied piles. As the fingers $d$ near the end of the back stroke the cam-surface 4, Fig. 6, on the disk 5 comes into contact with the L-shaped piece 3 and moves the clutch $r$ out of gear, disengagement occurring at just about the end of the stroke. This cycle of operations is now repeated; but two discharging-fingers 46, not hitherto mentioned, come into operation during the forward stroke. These are adapted to slide longitudinally on horizontal shafts 47, preferably square in cross-section (see Fig. 12) and journaled at the ends, the shafts being disposed laterally clear of the pile within the press. A pair of slide-blocks 48, running on suitable guides 49, engage with the tail ends 50 of the fingers 46, thus traversing them, but leaving them free to turn with the shafts 47 through an angle, as required. The slide-blocks 48 are coupled by connecting-rods 51 to the main feeding-fingers $d$, so that the pile-discharging fingers 46 are traversed simultaneously and in the same direction as the main feeding-fingers $d$. The pile-discharging fingers therefore engage with the tied pile and carry it out of the machine at the same time that the main feeding-fingers carry forward the next pile into the compressing position. Guide-shields or the like may be arranged to insure the bundles passing into the compressing position clear of the discharging mechanism. Spring extension-pieces may also be arranged on the ends of the feeding-fingers $d$, adapted to engage with and be depressed by guide-strips or the like fixed to the compressor-platen and projecting clear of the knotter-shaft 20. The feeding-fingers can in this way be of sufficient length and pass close up to the compressor-platen on their forward stroke without being caught on their return by the knotter-shaft attached to the platen, which has in the meantime descended. The discharging-fingers engage with suitable pivoted inclined guides or plates 52 on their return movement, so that they are turned up clear of the pile delivered into the compressing position. They, however, fall clear of these guide-plates when they reach the extreme point of their backward travel—this action being assisted by the spring-boxes 53, (see Fig. 13,) arranged on the shafts 47 and being limited in amount by the pins 54—and pass into the position for discharging the next completed bundle in due course. On the discharging stroke the plates 52 are lifted by the fingers 46 and fall back as soon as the latter have passed.

Although I have described mechanism mechanically linked together to perform the required sequence of operations, yet I do not limit myself to this form of mechanism, as it will be seen that I can readily substitute independent mechanism fulfilling each of the operations and link them together in other ways. For example, the separate mechanism may be driven electrically and the sequence of operations be controlled electrically by the closing of the circuits automatically in the proper order. It will also be seen that mechanical equivalents can be substituted for all the mechanisms found in the particular example I have above described.

Figs. 14 and 15 show a modified form of clutch in which projections 55 are formed on the claws and corresponding recesses 56 on the other parts. The object of these projections is to prevent the parts $s$ of the clutches being carried forward in advance of the parts $r$ owing to the pressure of the compressor-platen on the cams 8 when the frictional resistances are insufficient. Slight recesses 57 may also be provided in the cams 8, as shown in Fig. 1, for the purpose of insuring that the gear-wheels $p$ will be brought to rest and held after each revolution in exactly the same position.

Having now described my invention, what I claim as new, and desire to secure by Letters Patent, is—

1. In combination in a bundling-press, means for reducing a dimension of a bundle including coöperating compressing elements, one of which is fixed during the compression operation and disposed to prevent motion of the bundle past it in the direction of reduction, together with means for tying said bundle when compressed by said compressing elements.

2. In combination in a bundling-press, means for reducing a dimension of a bundle including coöperating compressing elements, one of which is fixed during the compression operation and disposed to prevent motion of the bundle past it in the direction of reduction, together with means for feeding said bundle into the compressing position and means for tying said bundle when compressed by said compressing elements.

3. In combination in a bundling-press, means for reducing a dimension of a bundle including coöperating compressing elements, one of which is fixed during the compression operation and disposed to prevent motion of the bundle past it in the direction of reduction, together with means for tying the bundle when compressed by said compressing elements and means for discharging said bundle.

4. In combination in a bundling-press, a fixed table, means for directly compressing a bundle against said table to reduce the dimensions of the bundle in a direction perpendicular to the plane of said table, together with means for tying said bundle.

5. In combination in a bundling-press, a fixed table; means for directly compressing a bundle against said table to reduce the dimensions of the bundle in a direction perpendicular to the plane of said table, together with means for feeding said bundle into the compressing position and means for tying said bundle.

6. In combination in a bundling-press, a fixed table; means for directly compressing a bundle against said table to reduce the dimensions of the bundle in a direction perpendicular to the plane of said table, together with means for tying said bundle and means for discharging the same.

7. In combination in a bundling-press, a fixed table; a compressing element moving toward and from said table and acting to reduce the dimensions of a bundle in a direction perpendicular to the plane of the table together with means for tying said bundle.

8. In combination in a bundling-press, a fixed table; a compressing element moving toward and from said table and acting to reduce the dimensions of a bundle in a direction perpendicular to the plane of the table together with means for feeding the bundle into the compressing position and means for discharging the same.

9. In combination in a bundling-press, a fixed table; a compressing element moving toward and from said table and acting to reduce the dimensions of a bundle in a direction perpendicular to the plane of the table together with means for tying the bundle and means for discharging the same.

10. In combination in a bundling-press, a table, a compressing-platen moving vertically toward and from the said table with means for tying the bundle, the said tying means being associated with the compressing-platen to move therewith, substantially as described.

11. In combination in a bundling-press, a fixed table, a compressing-platen moving vertically toward and from said table, means for feeding forward the bundle to be compressed into position beneath the compressing-platen together with means for tying the bundle and means for discharging the same, substantially as described.

12. In combination in a bundling-press, a table, a compressing-platen moving vertically toward and from the said table, means for feeding forward the bundle to be compressed into position beneath the compressing-platen, means for tying the bundle and means for discharging the same, the said tying means being associated with the compressing-platen to move therewith, substantially as described.

13. In a bundling-press, the combination of a table, a compressing-platen operating toward and from said table, feeding means comprising a slide, a crank and a rod connected to the said slide, a main shaft for operating the crank, guide-bars for the said slide and fingers carried on the slide, the said table being slotted to allow the fingers to project through and engage the bundle, substantially as described.

14. In a bundling-press, the combination of a table with means for feeding the bundle over the same, a compressing-platen movable toward and from said table, pillars for supporting the platen, said pillars being movable through a part of the frame of the machine, cross-bars loosely mounted upon lower ends of the pillars, the said pillars having collars resting on the cross-bars by which the pillars are supported, counterweights connected to the cross-bars for lifting the same, cams for depressing the cross-bars and intermittently-rotating shafts carrying the said cams, substantially as described.

15. In a bundling-press, the combination of a table, means for feeding the bundles along the top of the said table, a compressing-platen movable toward and from the table and means for operating the platen, comprising vertical links connected at their upper ends to the compressing-platen, horizontal levers, pivotally supported and connected to the lower ends of the vertical levers, rollers on said horizontal levers, cams contacting with the said rollers and having recesses therein adapted to engage the rollers to insure the arrest and holding of the rollers in exact position and shafts operating the cams, substantially as described.

16. In combination in a bundling-press, means for compressing the bundle, including a compressing-platen, and tying means, needle-bars having spring-controlled extensions provided with eyes for the string and deflector-plates on the compressing-platen adapted to engage the spring-controlled extensions of the needle-bars, substantially as described.

17. In a bundling-press, the combination of a compressing-platen, tying means, string-feeding bars and means for operating the said string-feeding bars comprising levers pivotally supported, links connecting the said levers with the said feeding-bars, a rotating shaft, a crank-pin thereon and a connecting-rod between the said crank-pin and one of the said levers and a spring between the connecting-rod and the said lever, substantially as described.

18. In a bundling-press, the combination of compressing means, means for moving the same, knotting devices moving with the compressing means and means for operating the knotting devices comprising a shaft extending horizontally, a vertical shaft provided with a keyway, bevel-gearing between the horizontal and vertical shaft, said gearing being arranged to have movement along the vertical shaft and means for driving the vertical shaft, substantially as described.

19. In combination in a bundling-press, a table, a compressing-platen and means for discharging the bundles comprising slide-blocks, guides for the said slide-blocks, spring-operated fingers carried by the slide-blocks and adapted to engage the bundle and means for holding the said fingers on their return stroke out of line with the bundle, substantially as described.

20. In combination in a bundling-press, a table, a compressing-platen, feed-fingers reciprocating along the table, discharge-fingers connected with the feed-fingers to move in unison therewith, slide-blocks and shafts on which the discharge-fingers are pivotally supported and means for throwing the discharge-fingers out of line with the bundles on their return stroke, substantially as described.

21. In a bundling-press, the combination of a table, compressing means, slide-blocks with means for reciprocating the same, discharge-fingers pivotally mounted and moved by the slide-blocks, plates hinged on the frame and arranged in the path of the discharge-fingers, said plates allowing the discharge-fingers to raise them during the forward stroke and said hinged plates turning the discharge-fingers into a vertical position during their return stroke, shafts rectangular in cross-section passing through a part of the discharge-fingers and spring-boxes acting on the shaft for returning the discharge-fingers to their horizontal position, substantially as described.

22. In combination in a bundling-press, a table, a compressing-platen, discharge-fingers pivotally mounted, slide-blocks, plates hinged to a part of the frame and arranged in the path of the discharge-fingers to be raised thereby on the forward stroke of the discharge-fingers, said plates serving to lift the discharge-fingers out of line with the bundle on their return stroke, substantially as described.

23. In a bundling-press, the combination of a table, compressing means, discharge-fingers having bosses which are provided with projections, reciprocating blocks arranged to engage the projections of the discharge-fingers, shafts rectangular in cross-section passing through the bosses, spring-boxes to operate the said shafts and return the fingers to their lowermost positions and pins fixed on reciprocating blocks to engage the projections of the discharge-fingers to limit the movement thereof, substantially as described.

24. In a bundling-press, the combination of a table, feed-fingers moving along the same, a main shaft a crank-and-pitman connection therefrom to the feed-fingers, a compressing-platen tying mechanism, string-feeding devices, a secondary shaft, means for operating the same intermittingly from the main shaft and connections from the secondary shaft to the compressing-platen the tying means and the string-feeding devices, substantially as described.

25. In combination, in a bundling-press, a table, a compressing-platen, tying mechanism, string-feeding mechanism, feed-fingers, a main shaft, connections between the main shaft and the feed-fingers, secondary shafts, connections therefrom to the compressing-platen the tying mechanism and the string-feeding mechanism, spur-wheels loose on the main shaft, spur-wheels on the secondary shafts, clutches for connecting the spur-wheels first mentioned with the main shaft and disconnecting the same therefrom, clutch-forks for operating the clutches and means for operating the clutch-forks, substantially as described.

26. In combination in a bundling-press, a table, feed-fingers movable along the same, a compressing-platen moving toward and from the table, a main shaft, connections therefrom to the feed-fingers for operating the same, secondary shafts, means thereon for operating the compressing-platen, and connections from the main shaft to the secondary shafts for operating the same intermittingly, substantially as described.

27. In combination in a bundling-press, a table, a compressing-platen, string-tying devices, feed-fingers, a main shaft, connections between the main shaft and the feed-fingers, secondary shafts, connections therefrom to the compressing-platen and the string-tying devices, and connections for operating the secondary shafts intermittingly from the main shaft, substantially as described.

28. In a bundling-press, the combination of a table, a compressing-platen, feed-fingers, string-feeding devices, a main shaft, connections between the said main shaft and the feed-fingers, secondary shafts, connections therefrom to the string-feeding devices and the compressing-platen, and connections for operating the secondary shafts intermittingly from the main shaft, substantially as described.

29. In combination in a bundling-press, a table, a compressing-platen movable toward and from the same, tying mechanism, a main shaft, connections for operating the compressing mechanism and the tying mechanism, clutches controlling the said connections, clutch-forks engaging the clutches, shafts on which the said forks are fixed, cam surfaces or disks fixed on the main shaft for acting on the forks to throw the clutches out and springs for throwing the clutch-forks in, substantially as described.

30. In a bundling-press, the combination of compressing means, string-tying devices, connections for operating the same, controlling mechanism for the said connections, means for operating the said controlling mechanism said means being acted on by the bundle, when said bundle is moved to a certain position and means for feeding the bundle to the said position substantially as described.

31. In a bundling-press, the combination of a table, compressing means, tying devices, operating connections leading to said means and devices, controlling mechanism for said connections including a clutch, and a plate at the table level arranged to be operated by the bundle, said plate operating the controlling mechanism, substantially as described.

32. In combination in a bundling-press, the compressing-platen, tying devices, means for operating and controlling them including a clutch, a movable plate arranged to be operated by the bundle, a resilient connection between the said plate and the clutch and a counterbalance-weight for raising the plate when no bundle is present, substantially as described.

33. In combination, in a bundling-press, a compressing-platen, feed-fingers, a main shaft, connections between the main shaft and feed-fingers, secondary shafts connections therefrom to the compressing-platen and means for driving the secondary shafts intermittingly from the main shaft comprising clutches having projections 55 and corresponding recesses 56, substantially as described.

In witness whereof I have hereunto set my hand in presence of two witnesses.

GEORGE HERBERT ADSHEAD.

Witnesses:
ALBERT E. PARKER,
BERTRAM H. MATTHEWS.